(No Model.)

J. R. DAVIS.
WHIFFLETREE HOOK.

No. 513,309. Patented Jan. 23, 1894.

Witnesses:
H. Graham
Jno. L. Condron

Inventor
John R. Davis.
By Dayton, Poole & Brown,
Atty's.

UNITED STATES PATENT OFFICE.

JOHN R. DAVIS, OF RACINE, WISCONSIN.

WHIFFLETREE-HOOK.

SPECIFICATION forming part of Letters Patent No. 513,309, dated January 23, 1894.

Application filed May 1, 1893. Serial No. 472,527. (No model.)

*To all whom it may concern:*

Be it known that I, JOHN R. DAVIS, of Racine, in the county of Racine and State of Wisconsin, have invented certain new and useful Improvements in Whiffletree-Hooks; and I do hereby declare that the following is a full, clear, and exact description thereof, reference being had to the accompanying drawings, and to the letters of reference marked thereon, which form a part of this specification.

This invention relates to whiffletree-hooks and is an improvement on the construction shown in Letters Patent No. 428,896, granted to me May 27, 1890.

The primary object of my invention is to provide a construction of the ferrule by which the trace-hook will be held in its proper place thereon without aid from the pins used to hold the ferrule upon the whiffletree, which pins, in my said prior patent, were made to project beyond the peripheral surface of the ferrule for this purpose. It was a fault of that prior construction that these pins, by reason of their projection, became loose and dropped out, thus allowing the hook to slip back upon the wood and also allowing the ferrule to come off the whiffle-tree.

For the remedy of this fault the present invention consists in the provision of a projection on the ferrule and integral therewith at the point where one of said projecting pins was previously placed, and in a certain formation of the eye of the trace-hook such that it may be readily applied to the ferrule, having such added projection, before the ferrule is attached to the whiffletree.

Figure 1:
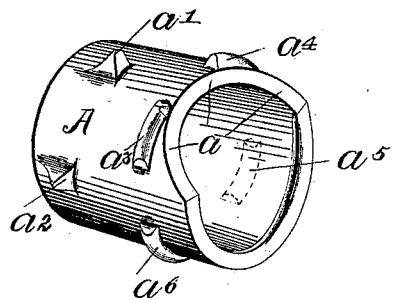
Figure 2:
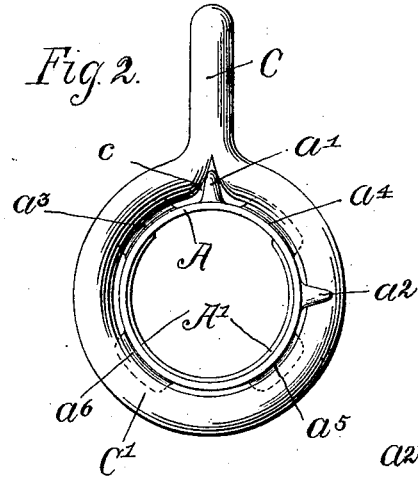
Figure 3:
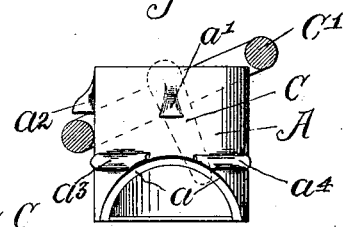
Figure 4:
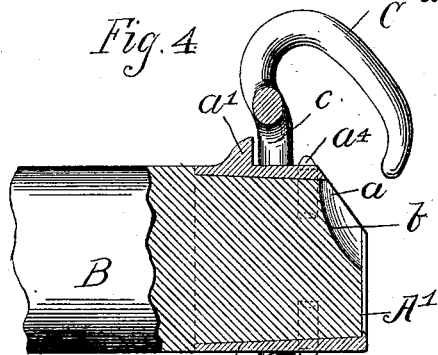

Referring to the accompanying drawings in illustration of my invention, Figure 1 is a perspective view of the ferrule detached. Fig. 2 is an inner end view of the ferrule, showing the trace-hook in the position to which it is brought in being applied to the ferrule before the application of the latter to the whiffletree. Fig. 3 is a side elevation of the ferrule, showing the trace-hook by dotted lines and in central section through the eye, said hook being in the inclined position to which it is brought in applying it to the improved ferrule. Fig. 4 is an axial section through the ferrule applied to the whiffletree, showing the trace-hook in section upon the ferrule and in position to receive the cock-eye of a trace.

A designates a metal ferrule of generally cylindric or slightly conical form, which is to be applied firmly around the end of a whiffletree B. The outer end of the ferrule is cut away obliquely at one side, as seen at $a$ in Figs. 1, 3 and 4, and the wood of the whiffletree is correspondingly cut away or recessed as shown at $b$ in Fig. 4, the coinciding recesses of the whiffletree and ferrule being at the upper side of said whiffletree.

The ferrule A is of cast metal, and upon its outer surface and near its inner end is cast a lug $a'$ situated at a point opposite the middle of the recess $a$. At a point about ninety degrees forwardly from the lug $a'$ and in the same circumferential line therewith is also cast the auxiliary lug $a^2$ which may be similar in form to the lug $a'$. Upon the periphery of the ferrule and in or near the circumferential line of the upper or innermost point of the recess $a$ and in the position of the circumferential rib C of my said prior patent, are cast a series of lugs or circumferentially directed ribs, here shown as being four in number and lettered $a^3$ $a^4$ $a^5$ and $a^6$. Having reference to the lengthwise draft of the pattern for this cast ferrule from the sand, spaces between these ribs are provided opposite the lugs $a'$ and $a^2$, and except for this purpose or for the purpose of lightness, the said ribs may be extended into connection with each other. They may also, if desired, be a series of projecting points or may have any other suitable form and number to prevent the outward displacement of the trace-hook, when present upon the ferrule.

In order to apply the trace-hook to the ferrule having the fixed lugs $a'$ and $a^2$ said hook is constructed with a notch $c$ in its inner periphery, adapted to pass freely over the lug $a'$, and the interior diameter of the trace-hook is made somewhat larger than the diameter of the inner end of the ferrule. Thus constructed the trace-hook is brought to the position indicated in Figs. 2 and 3 with one side beneath the lug $a^2$ and the notch $c$ coincident with the lug $a'$. In this position of the notch $c$ with reference to the said lug $a'$ the opposite side of the trace-hook may be dropped down over the inner end of the ferrule, the lug $a'$ passing through the notch $c$. After the ferrule has been applied to the whiffletree the trace-hook cannot be removed from the ferrule and it has only the desired rotative movement about the ferrule with its eye confined between the lugs $a'$ $a^2$ on the one side and the outer ribs or projections on the other. If the point of the hook C be long enough, as it should be, to reach inward past the end of the ferrule, when in proper place thereon, as indicated in Fig. 4, then the notch $c$ in the eye of the trace-hook should be made at the base of the hook, as indicated in Fig. 2.

As a further improvement and for the reason that, in practice, the ferrule at its inner end is thin, I provide the outer end of the ferrule with the inwardly directed flange A' which strikes against the wood of the whiffletree at its end and effectually limits the inward movement of the ferrule upon the whiffletree in its application thereto. The ferrule thus constructed may be secured upon the whiffletree by one or more holding pins or screws let in to their full length and, therefore, not subject to be loosened by reason of their projection, as in the construction upon which this invention is an improvement.

I claim as my invention—

The combination of the ferrule A provided with the recess $a$, outer peripheral ribs or projections and the inner lugs $a'$ $a^2$, arranged substantially as described, and the trace-hook provided with a notch $c$ and having an inner diameter adapting it to be applied to the ferrule in a tilted position, substantially as and for the purpose set forth.

In testimony that I claim the foregoing as my invention I affix my signature in presence of two witnesses.

JOHN R. DAVIS.

Witnesses:
F. E. BABE,
MAX W. HECK.